United States Patent
Choi et al.

(10) Patent No.: US 6,729,858 B2
(45) Date of Patent: May 4, 2004

(54) THRUST BEARING COOLING UNIT FOR A TURBO COMPRESSOR

(75) Inventors: Moon-Chang Choi, Gwangmyeong (KR); Kwang-Ha Suh, Gunpo (KR); Young-Kwan Kim, Bucheon (KR); Yoo-Chol Ji, Incheon (KR); Dae-Sung Wang, Seoul (KR); Hoi-Sun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 49 days.

(21) Appl. No.: 10/152,628

(22) Filed: May 23, 2002

(65) Prior Publication Data

US 2003/0059315 A1 Mar. 27, 2003

(30) Foreign Application Priority Data

Sep. 25, 2001 (KR) .......................................... 2001-59339

(51) Int. Cl.[7] .......................... F04B 17/00; F04B 25/00
(52) U.S. Cl. ........................ 417/365; 417/244; 417/357; 417/366; 417/371; 417/372
(58) Field of Search ................................ 417/244, 350, 417/357, 365, 423.12, 366, 371, 372, 423.8

(56) References Cited

U.S. PATENT DOCUMENTS

| | | | | |
|---|---|---|---|---|
| 1,508,805 A | * | 9/1924 | Shaw et al. | 417/371 |
| 2,793,506 A | * | 5/1957 | Moody | 62/505 |
| 3,118,384 A | * | 1/1964 | Sence | 417/370 |
| 3,618,337 A | * | 11/1971 | Mount | 62/505 |
| 5,674,056 A | * | 10/1997 | Yamamoto et al. | 417/366 |

FOREIGN PATENT DOCUMENTS

| | | | | |
|---|---|---|---|---|
| JP | 62-93404 | * | 4/1987 | F01D/13/02 |
| JP | 62-294701 | * | 12/1987 | F01D/3/00 |

* cited by examiner

*Primary Examiner*—Justine R. Yu
*Assistant Examiner*—Timothy P. Solak
(74) *Attorney, Agent, or Firm*—Birch, Stewart, Kolasch & Birch, LLP

(57) ABSTRACT

A system for cooling a turbo compressor includes two compressing parts on opposite ends of a rotational shaft driven by a motor. Fluid from a fluid chamber within the casing of the device is supplied to a bearing chamber when the temperature of the bearing chamber increases. A supply passage is formed in a first support where the radial bearing for supporting a load in the axial direction is formed. The open-and-shut valve supplies fluid when the temperature of the bearing chamber increases.

4 Claims, 4 Drawing Sheets

THRUST BEARING COOLING UNIT FOR A TURBO COMPRESSOR

BACKGROUND OF THE INVENTION

1. Field of the Invention

The present invention relates to a turbo compressor, and more particularly, to a turbo compressor that is capable of effectively cooling a bearing which supports a rotational shaft.

2. Description of the Background Art

FIG. 1 is a sectional view of a turbo compressor in accordance with a conventional art.

As shown in FIG. 1, the conventional turbo compressor includes a casing 106 having a suction hole 102 for sucking a fluid from an outside and a discharge hole 104 for discharging the sucked fluid, and having a certain space; a driving unit 108 installed inside the casing 106 and generating a rotational force; a first compressing part 112 connected to the driving unit 108 by a rotational shaft 110 and first compressing fluid; and a second compressing part 114 for secondly compressing the fluid compressed by the first compressing part 112.

In the casing 106, a fluid chamber 120 for sucking a fluid through the suction hole is formed, a first support member 116 for rotatably supporting one end portion of the rotational shaft 110 is fixed at one side of the casing 106, and a second support member 118 for rotatably supporting the other end portion of the rotational shaft 110 is fixed at the other side of the casing 106.

The driving unit 108 includes a stator 122 fixed at an outer circumferential face of the casing 106 and receiving a power from an external source, and a rotor 124 fixed at a circumferential face of the rotational shaft 110 and being rotated by an interaction with the stator 122.

The first compressing part 112 includes a first impeller 126 connected to one end portion of the rotational shaft 110 and compressing the fluid by being rotated along with the rotational shaft 110; and a first cover member 132 in which the first impeller 126 is rotatably inserted, a first compression chamber 128 is connected to the discharge hole 104 of the main body, into which the fluid of the fluid chamber 120 is introduced and first compressed, and a transfer passage 130 is formed to discharge the compressed fluid.

The second compressing part 114 includes a second impeller 134 connected to the other end portion of the rotational shaft 110 and compressing the fluid by being rotated along with the rotational shaft 110; and a second cover member 140 in which the second impeller 134 is rotatably inserted, a second compression chamber 136 is formed connected to the transfer passage 130 into which the first compressed fluid is introduced and secondly compressed, and a discharge hole 138 is formed to externally discharge the compressed coolant.

A radial bearing 142 is inserted between the first support member 116 and the outer circumferential face of the rotational shaft 110 and between the second support member 118 and the outer circumferential face of the rotational shaft 110, to support a load working in a radial direction of the rotational shaft 110.

A bearing bush 144 is connected in a vertical direction to the rotational shaft at one side thereof. The bearing bush 144 is supplied by a thrust bearing 146 which supports a load working in an axial direction of the rotational shaft 110.

The thrust bearing 146 is installed between the first cover member 132 and the first support member 116, and a bearing chamber 148 is formed where the bearing bush 144 is rotatably positioned.

A sealing member 150 is inserted between the outer circumferential face of both end portions of the rotational shaft 110 and the first cover member 132, to prevent leakage of the fluid compressed in the first and the second compression chambers 128 and 136.

The operation of the turbo compressor in accordance with the conventional art constructed as described above will now be explained.

When the driving unit 108 is driven, the rotational shaft 110 is rotated. Then the first impeller 126 and the second impeller 134 connected to the rotational shaft 110 are rotated to perform a compressing operation of the fluid.

That is, the fluid is introduced into the fluid chamber 120 through the suction hole 102, and the fluid introduced into the fluid chamber 120 is introduced into the first compression chamber 128 through the discharge hole 104, first compressed according to the rotation of the first impeller 126 and then supplied to the transfer passage 130.

The fluid supplied to the transfer passage 130 is introduced into the second compression chamber 136, secondly compressed by the rotation of the second impeller 134 and then externally discharged through the discharge hole 138.

At this time, when the rotational shaft 110 is being rotation, a load working in a radial direction of the rotational shaft 110 is supported by the radial bearing 142.

Since the pressure in the first compression chamber 128 which compresses the fluid first is smaller than that of the second compression chamber 136, an axial-directional load works on the rotational shaft 110 due to the pressure difference between the first compression chamber 128 and the second compression chamber 136. Such axial-directional load is supported by the thrust bearing 146.

In this respect, since the rotational shaft 110 is rotated at a high speed, a temperature of the bearing chamber 148 with the thrust bearing 146 is inserted is increased and the thrust bearing 146 is degraded. Thus, in view of the performance of the whole system and in order to lengthen the life of the bearing, it is requisite to cool the thrust bearing 146 and maintain its temperature to below a certain level.

The conventional bearing cooling method is that, in designing a structure of the sealing member 150 inserted between the first cover member 132 and the rotational shaft 110, a certain leakage of fluid is allowed to occur, so that when the fluid which is first compressed after being introduced into the first compression chamber 128 is introduced into the bearing chamber 148 through the sealing member 150, thereby performing a cooling operation of the thrust bearing 146.

However, the conventional turbo compressor has a problem that the leakage amount of fluid supplied from the first compression chamber to the bearing chamber differs depending on a structure designing of the sealing member.

That is, if a small amount of fluid is leaked to the bearing chamber, the cooling operation of the thrust bearing is not smoothly performed, and thus, the temperature is increased according to the friction of the bearing. Then, a coating layer of the bearing is damaged, resulting in that the performance of the whole system is degraded, the durability of the bearing is shortened, and a reliability is degraded.

On the other hand, if a large amount of fluid is leaked to the bearing chamber, when the fluid is compressed, a large amount of fluid is leaked, resulting in that a compression efficiency of the compressor is degraded.

SUMMARY OF THE INVENTION

Therefore, an object of the present invention is to provide a turbo compressor that is capable of smoothly performing a cooling operation of a bearing without degrading a compression performance of a compressor in such a manner that when a temperature of a bearing chamber with a thrust bearing inserted therein increases, a fluid is supplied to perform a cooing operation, and when the temperature of the bearing chamber reaches a suitable level, the fluid supply to the bearing chamber is cut off.

To achieve these and other advantages and in accordance with the purpose of the present invention, as embodied and broadly described herein, there is provided a turbo compressor including: a casing having a fluid chamber for receiving a fluid from an external source; a driving unit disposed in the casing and generating a rotational force; a first compressing part installed at one side of a rotational shaft rotated according to the driving of the driving unit and first compressing the fluid; a second compressing part installed at the other side of the rotational shaft and secondly compressing the fluid compressed in the first compressing part; and a bearing cooling unit for supplying a fluid of the fluid chamber to a bearing chamber to perform a cooling operation when a temperature of the bearing chamber where the thrust bearing for supporting a load working in an axial direction of the rotational shaft is mounted is increased, and cutting off the fluid from being introduced into the bearing chamber when the temperature of the bearing chamber is maintained at a proper level.

In the turbo compressor of the present invention, the bearing cooling unit includes a supply passage formed inside the casing to allow the bearing chamber and the fluid chamber to communicate with each other; and an open-and-shut valve installed at the supply passage and opening and closing the supply passage according to an internal temperature of the bearing chamber.

In the turbo compressor of the present invention, the supply passage is penetratingly formed at a first support member which is fixed at the inner side of the casing and rotatably supports one side of the rotational shaft.

In the turbo compressor of the present invention, the open-and-shut valve includes a valve body part formed having a certain space at the supply passage, a fixed plate fixed at one side of the valve body part and having a through hole communicating with the supply passage at a center thereof; and a bi-metal positioned adhesive to one face of the fixed plate, having a plurality of through holes at its marginal portion, and being deformed according to a temperature inside the bearing chamber.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

There may exist a plurality of embodiment of a turbo compressor in accordance with the present invention, of which the most preferred one will now be described.

Figure 1:
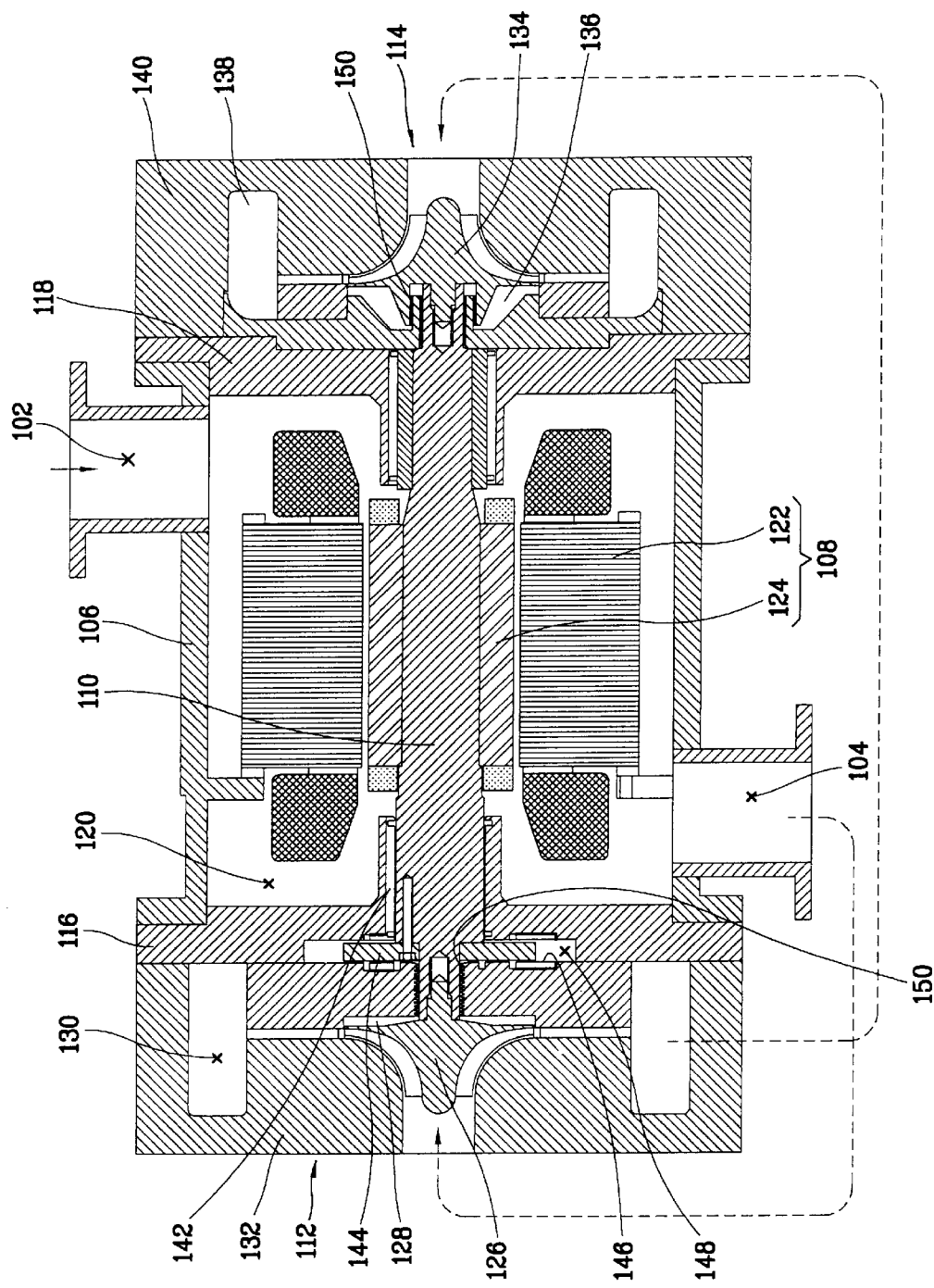
FIG. 1 is a sectional view of a turbo compressor in accordance with a conventional art.
Figure 2:
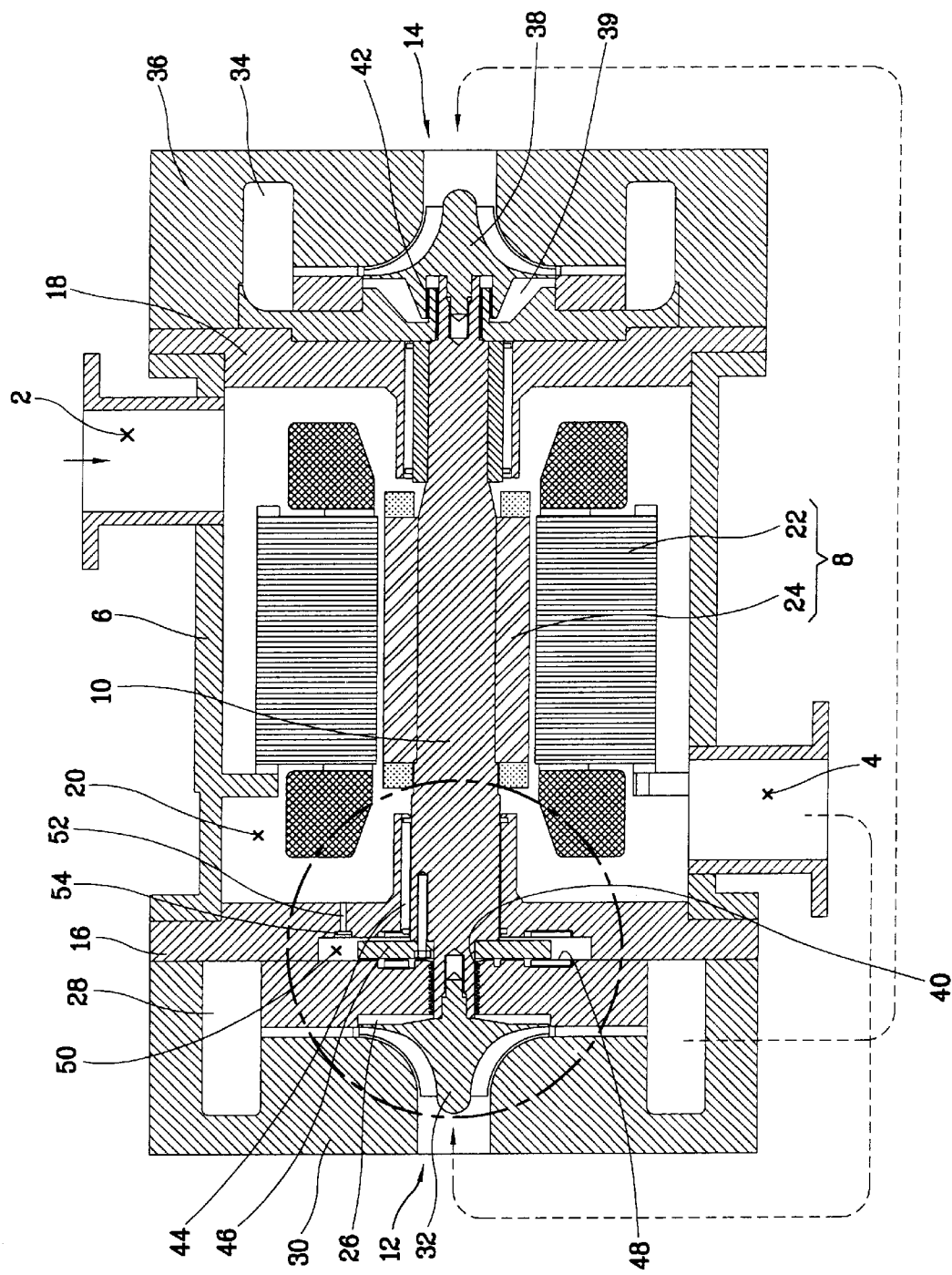
FIG. 2 is a sectional view of a turbo compressor in accordance with a preferred embodiment of the present invention.
Figure 3:
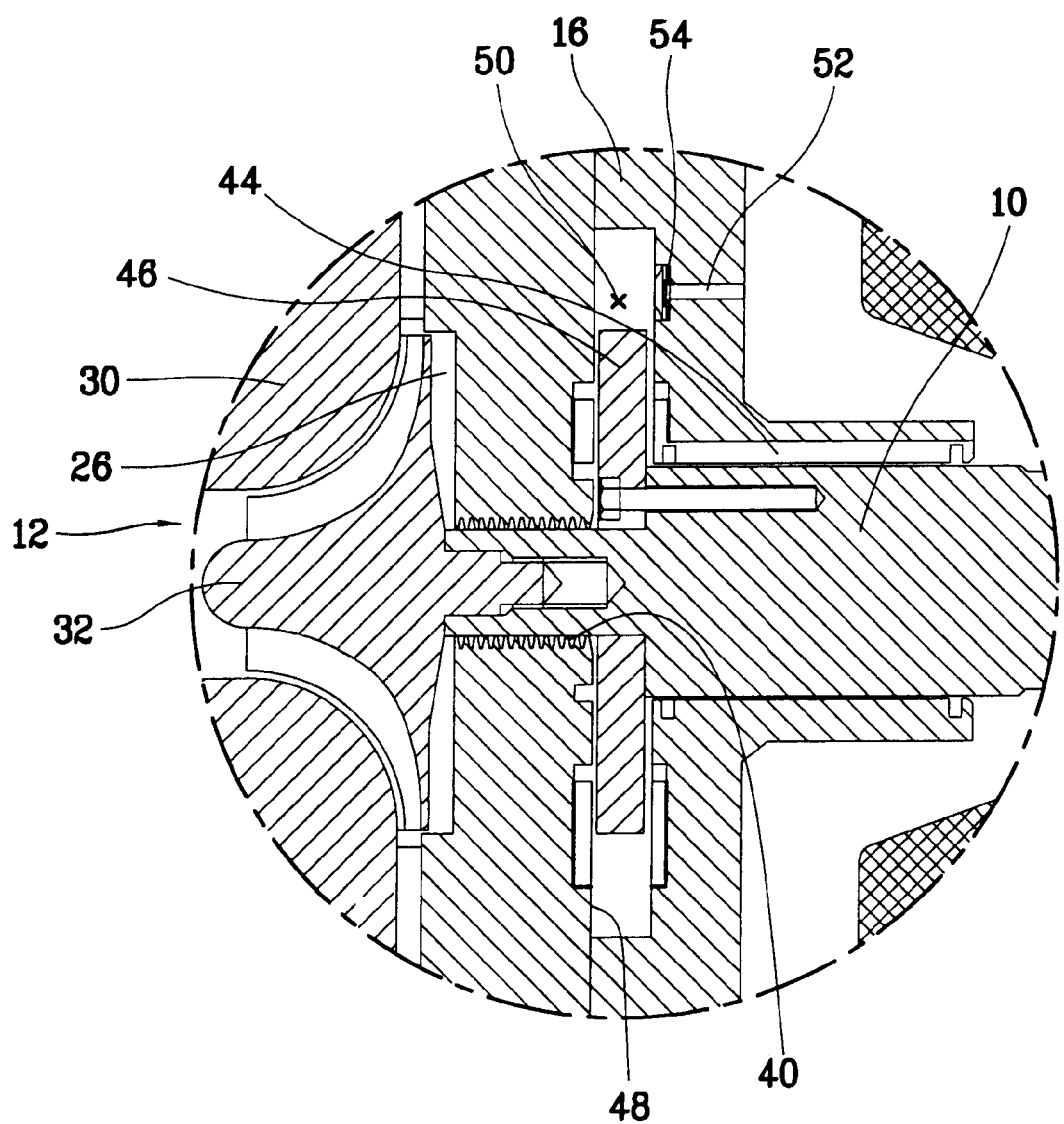
FIG. 3 is an enlarged sectional view showing a structure of a first compressing part of the turbo compressor in accordance with the preferred embodiment of the present invention.
Figure 4:
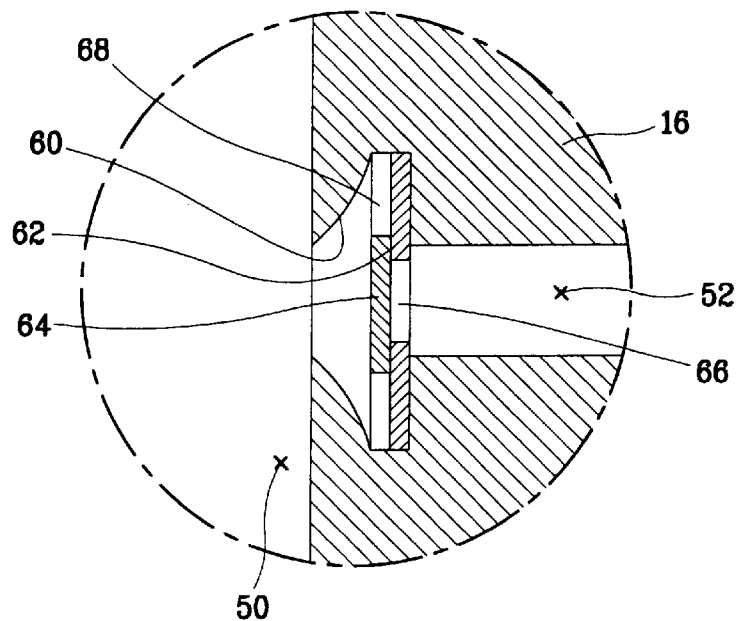
FIG. 4 is an enlarged view of portion 'A' of FIG. 3 showing a bearing cooling unit of the turbo compressor in accordance with the preferred embodiment of the present invention.
Figure 5:
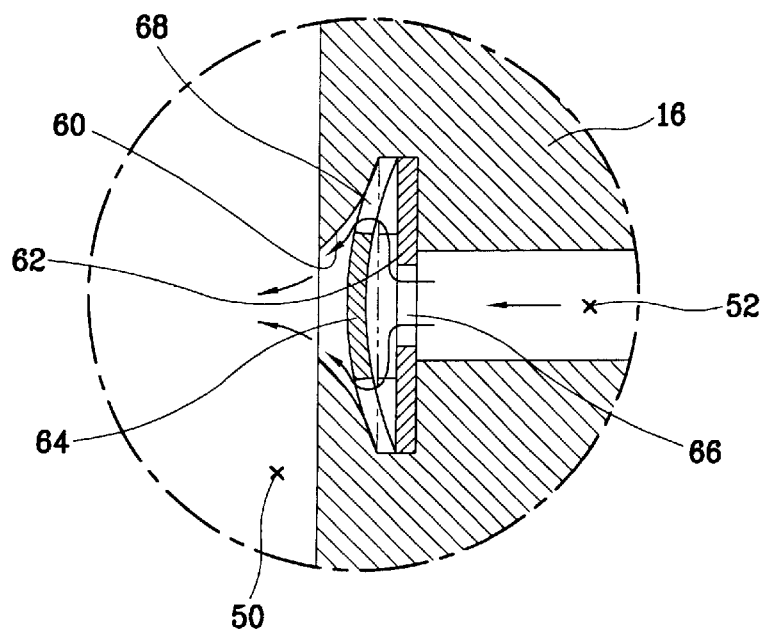
FIG. 5 is a view showing an operation state of the bearing cooling unit of the turbo compressor in accordance with the preferred embodiment of the present invention.

FIG. 1 is a sectional view of a turbo compressor in accordance with a conventional art, and FIG. 2 is a sectional view of a turbo compressor in accordance with a preferred embodiment of the present invention.

A turbo compressor of the present invention includes: a a casing 6 having a suction hole 2 for sucking a fluid from an outside and a discharge hole 4 for discharging the sucked fluid, and having a certain space; a driving unit 8 installed inside the casing 6 and generating a rotational force; a first compressing part 12 connected to the driving unit 8 by a rotational shaft 10 and first compressing fluid which is discharged from the discharge hole 4 of the casing 6; and a second compressing part 14 for secondly compressing the fluid compressed by the first compressing part 12.

The casing 6 has a cylindrical form, and a first support member 16 rotatably supporting one side of the rotational shaft 10 is hermetically fixed at one side of the casing 6, and a second support member 18 rotatably supporting the other side of the rotational shaft 10 is hermetically fixed at the other side of the casing 6.

A fluid chamber 20 is formed inside the casing 6. The fluid chamber 20 is hermetically sealed by the first and the second support members 16 and 18 and a fluid is sucked into the fluid chamber 20 through a suction hole 2.

The driving unit 8 includes a stator 22 fixed at an outer circumferential face of the casing and receiving a power supply from an external source, and a rotor 24 fixed at a circumferrential face of the rotational shaft 10 and is rotated according to an interaction with the stator 22.

The first compressing part 12 includes a first cover member 30 provided with a first compression chamber 26 fixed at a side face of the first support member 16 and connected to the discharge hole 4 of the main body and a transfer passage 28 for moving the fluid compressed in the first compression chamber 26 to a second compression chamber; and a first impeller 32 rotatably disposed at the first compression chamber 26 of the first cover member, connected to the rotational shaft 10, and compressing first the fluid introduced into the first compression chamber 26.

The second compressing part 14 includes a second cover member 36 having a second compression chamber 39 fixed at side face of the second support member 18 and connected to the transfer passage 28 and a discharge hole 34 for externally discharging the fluid which has been secondly compressed in the second compression chamber 39; and a second impeller 38 rotatably disposed at the second compression chamber 39 and secondly compressing the fluid introduced into the second compression chamber 39.

Sealing members 40 and 42 are respectively inserted between the rotational shaft 10 and the first cover member 30 and between the rotational shaft 10 and the second cover member 36, in order to prevent leakage of the fluid compressed in the first compression chamber 26 and the second compression chamber 39.

A radial bearing 44 is inserted between the rotational shaft 10 and the first support member 16 and between the rotational shaft 10 and the second support member 18, in order to support a load working in a radial direction of the rotational shaft 10.

A bearing bush 46 is fixed at one side of the rotational shaft 10 in a vertical direction to the rotational shaft 10. The bearing bush 46 is rotatably supported by a thrust bearing 48 which supports a load working in an axial direction of the rotational shaft 10.

The thrust bearing 48 is mounted between the first cover member 30 and the first support member 16, and a bearing chamber 50 is formed where the bearing bush 46 is rotatably positioned.

A bearing cooling unit is formed at one side of the first support member, to supply the fluid introduced into the fluid chamber 20 to the bearing chamber 50 to perform a cooling operation when a temperature of the bearing chamber 50 increases, and cut off the fluid from being introduced into the bearing chamber 50 when the temperature of the bearing chamber 50 is maintained at a suitable level.

The bearing cooling unit includes a supply passage formed at one side of the first support member 16 and allows the bearing chamber 50 and the fluid chamber 20 to communicate with each other and supplying the fluid inside the fluid chamber to the bearing chamber 50, and an open-and-shut valve 54 installed at the supply passage 52 and opening and closing the supply passage 52 according to an internal temperature of the bearing chamber 50.

The supply passage 52 is penetratingly formed at the first support member 16 and serves to supply the fluid introduced into the fluid chamber 20 to the bearing chamber 50.

The open-and-shut valve 54 includes a valve body part 60 formed having a space in a certain shape at one side of the supply passage 52, a fixed plate 62 hermetically fixed at the supply passage 52 of the valve body part 60 and having a through hole 66 communicating with the supply passage 52 at its central portion; and a bi-metal 64 positioned contacting one side of the fixed plate 62, having a plurality of through holes 68 at its marginal portion, and being deformed according to a temperature inside the bearing chamber 50.

That is, in the open-and-shut valve 54, when a temperature of the bearing chamber 50 is increased to a certain degree, the bi-metal 64 is deformed and separated from the fixed plate 62. Then, the supply passage 52 is opened so that the fluid inside the fluid chamber 20 is introduced into the bearing chamber 50 through the supply passage 52 to the bearing chamber 50, to perform a cooling operation.

When the temperature of the bearing chamber 50 is cooled to a proper level, the bi-metal 64 is restored to its original state and adhered to the fixed plate 62, thereby shutting the supply passage 52.

The operation of the turbo compressor constructed as described above will now be described.

When the driving unit 8 is driven, the rotor 24 is rotated. Then, the rotational shaft 10 is rotated and the first and the second impellers 32 and 38 connected to the rotational shaft are rotated, thereby performing a compression operation of the fluid.

That is, the fluid is sucked into the fluid chamber 20 through the suction hole 2 of the main body, supplied to the first compression chamber 26 through the discharge hole 4, first compressed according to rotation of the first impeller 32 and then moved to the transfer passage 28.

After being discharged into the transfer passage 28, the fluid is supplied to the second compression chamber 39, secondly compressed according to rotation of the second impeller 38, and then externally discharged through the discharge hole 34.

At this time, the radial directional load of the rotational shaft 10 is supplied by the radial bearing 44 mounted between the rotational shaft 10 and the first and the second support member 16 and 18.

A load is generated in an axial direction at the rotational shaft 10 due to the pressure difference between the first compression chamber 26 which compresses the fluid first and the second compression chamber 39 which compresses the fluid secondly, the load working in the axial direction of the rotational shaft 10 is supported by the thrust bearing 48 mounted in the bearing chamber 50.

During the compression operation, when a temperature of the bearing chamber 50 is increased due to the friction of the thrust bearing 48, the open-and-shut valve 54 is operated to open the supply passage 52 allowing the fluid chamber 20 and the bearing chamber 50 to communication with each other.

Then, the fluid introduced into the fluid chamber 20 is supplied to the bearing chamber 50 through the supply passage 52, to thereby perform a cooling operation of the thrust bearing 48.

As for the open-and-shut valve 54, when a temperature of the bearing chamber 50 is increased, the bi-metal 64 is deformed and separated from the fixed plate 62, and accordingly, the through hole 66 formed at the fixed plate 62 and the through hole 68 formed at the bi-metal 64 are communicated with each other, to open the supply passage 52.

And then, as the fluid is introduced into the bearing chamber 50 and cools the thrust bearing 48, when the temperature of the bearing chamber drops to a proper level, the bi-metal 64 is returned to its original state and adhered to the fixed plate 62, to thereby shut the supply passage 52.

The turbo compressor constructed and operated as described above is preferably used as a compressor of a freezing cycle.

As so far described, the turbo compressor of the present invention has many advantages.

That is, for example, the supply passage for allowing the bearing chamber and the fluid chamber receiving the fluid to communicate each other is formed at the first support member where the radial bearing supporting a load working in an axial direction of the rotational direction is formed and the open-and-shut valve is formed to open and shut the supply passage according to a temperature of the bearing chamber, in order to supply fluid to the bearing chamber according to the temperature of the bearing chamber and perform a cooling operation of the radial bearing.

Thus, the temperature of the radial bearing can be constantly maintained at a proper level, so that a degradation due to a friction of the bearing can be prevented, and the lifespan and a reliability of the bearing can be improved.

In addition, since the fluid is supplied to the bearing chamber only when the temperature of the bearing chamber is increased, a performance degradation of the compressor according to a leakage of the fluid can be prevented.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A turbo compressor comprising:

a casing having a fluid chamber for receiving a fluid from an external source;

a driving unit disposed in the casing and generating a rotational force;

a first compressing part installed at one end of a rotational shaft rotated by the driving unit and first compressing the fluid;

a second compressing part installed at the other end of the rotational shaft and secondly compressing the fluid compressed in the first compressing part; and a bearing cooling unit for supplying fluid from the fluid chamber to a bearing chamber to perform a cooling operation when a temperature of the bearing chamber, where a thrust bearing for supporting a load working in an axial direction of the rotational shaft is mounted, is increased, and cutting off the fluid from being introduced into the bearing chamber when the temperature of the bearing chamber is maintained at a proper level.

2. A turbo compressor comprising:

a casing having a fluid chamber for receiving a fluid from an external source;

a driving unit disposed in the casing and generating a rotational force;

a first compressing part installed at one end of a rotational shaft rotated by the driving unit and first compressing the fluid;

a second compressing part installed at the other end of the rotational shaft and secondly compressing the fluid compressed in the first compressing part; and a bearing cooling unit for supplying fluid from the fluid chamber to a bearing chamber to perform a cooling operation when a temperature of the bearing chamber, where a thrust bearing for supporting a load working in an axial direction of the rotational shaft is mounted, is increased, and cutting off the fluid from being introduced into the bearing chamber when the temperature of the bearing chamber is maintained at a proper level;

wherein the bearing cooling unit comprises:

a supply passage formed inside the casing to allow the bearing chamber and the fluid chamber to communicate with each other; and an open-and-shut valve installed in the supply passage and opening and closing the supply passage according to an internal temperature of the bearing chamber.

3. The compressor of claim 2, wherein the supply passage is penetratingly formed at a first support member which is fixed at the inner side of the casing and rotatably supports one end of the rotational shaft.

4. The compressor of claim 2, wherein the open-and-shut valve comprises:

a valve body part formed having a certain space at the supply passage;

a fixed plate fixed at one side of the valve body part and having a through hole communicating with the supply passage at a center thereof; and a bi-metal contacting one face of the fixed plate, having a plurality of through holes at its marginal portion, and being deformed according to a temperature inside the bearing chamber.

* * * * *